No. 757,810. PATENTED APR. 19, 1904.
C. R. HUDSON.
MEASURING APPARATUS.
APPLICATION FILED MAR. 14, 1901.
NO MODEL. 2 SHEETS—SHEET 2.
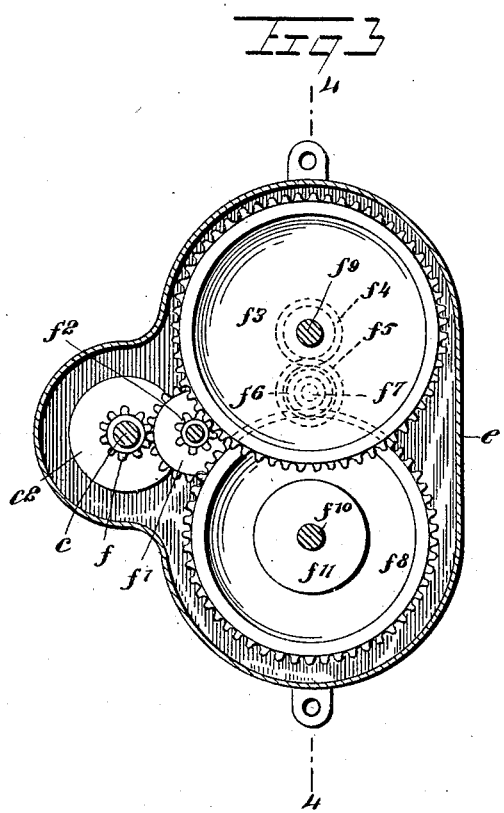
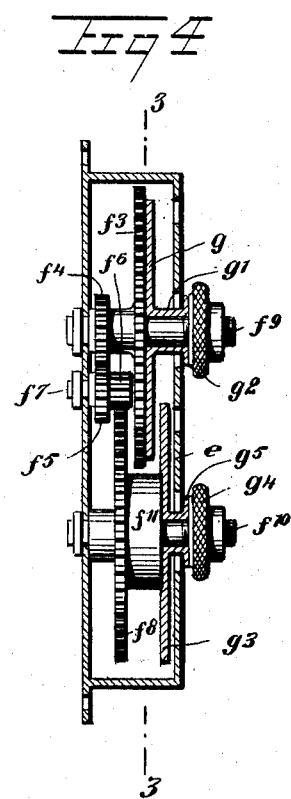
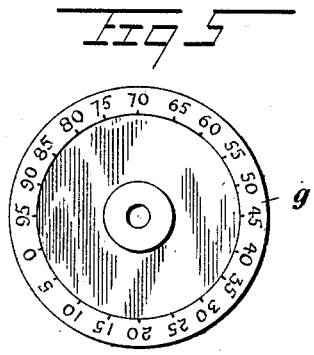
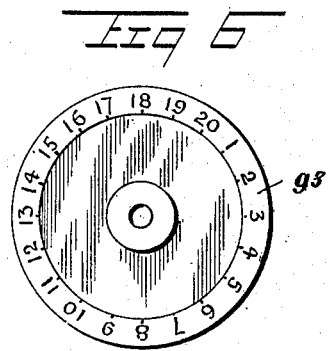
WITNESSES:
H. W. Walker
E. B. Owens
INVENTOR
Charles R. Hudson
BY
ATTORNEYS No. 757,810. Patented April 19, 1904.

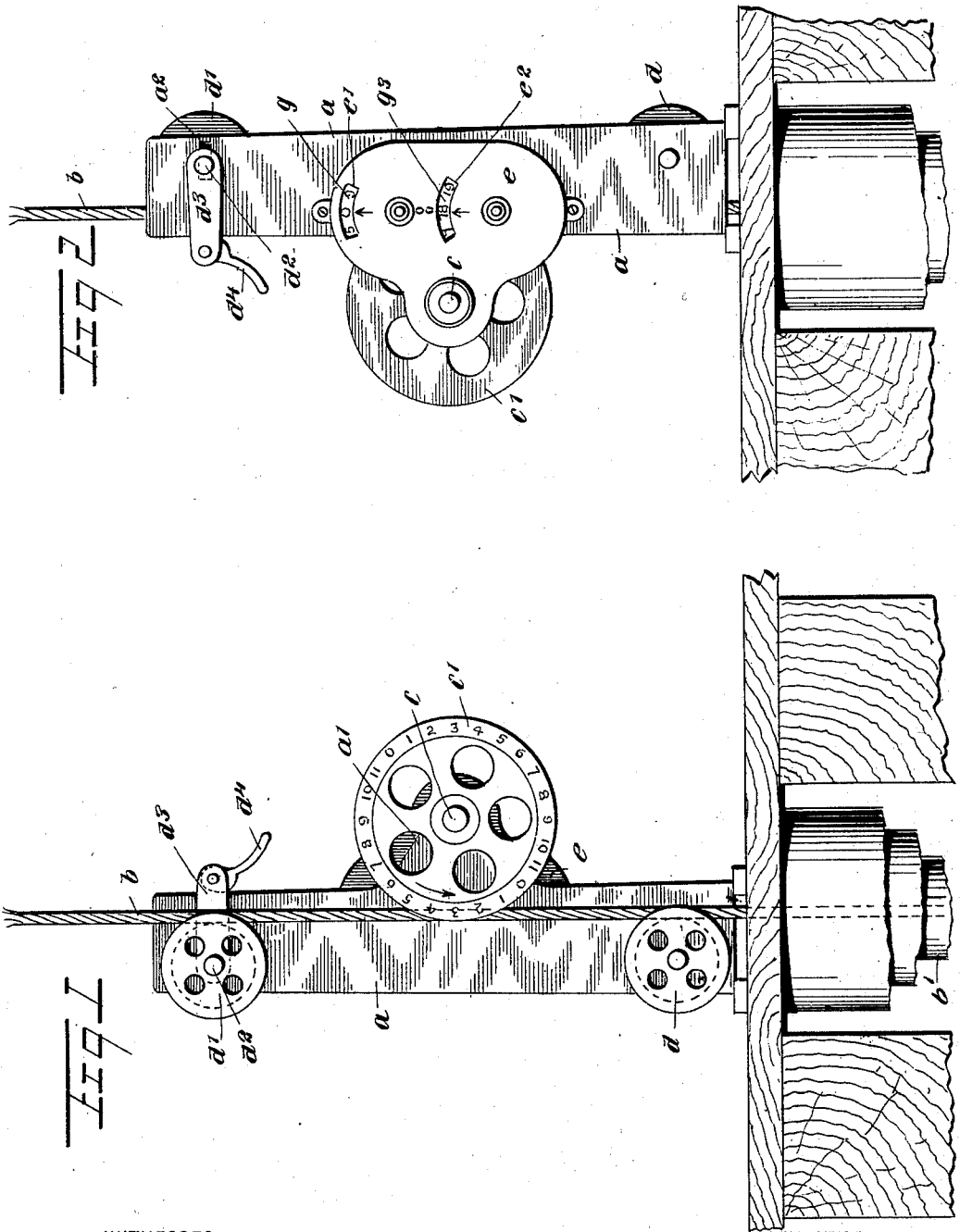

UNITED STATES PATENT OFFICE.

CHARLES RIPLEY HUDSON, OF WARREN, INDIANA.

MEASURING APPARATUS.

SPECIFICATION forming part of Letters Patent No. 757,810, dated April 19, 1904.

Application filed March 14, 1901. Serial No. 51,090. (No model.)

*To all whom it may concern:*

Be it known that I, CHARLES RIPLEY HUDSON, a citizen of the United States, and a resident of Warren, in the county of Huntington and State of Indiana, have invented a new and Improved Measuring Apparatus, of which the following is a full, clear, and exact description.

This invention relates to an apparatus for measuring the depth of wells, whether driven or drilled. Heretofore the method almost invariably employed for this purpose has been to lower into the well a sort of sounding-line formed of a slight steel ribbon with a weight at the end. This method is uncertain and otherwise disadvantageous for various reasons.

My invention comprises a peculiarly-arranged instrument adapted to be used in connection with a line descending into the well and to indicate the depth to which such line descends. Preferably the instrument is used in connection with the sand-line which is attached to the bailer of the well-driving apparatus; but of course it will be understood that the invention is not limited to such connection.

This specification is a specific description of one form of the invention, while the claim is a definition of the actual scope thereof.

Reference is to be had to the accompanying drawings, forming a part of this specification, in which similar characters of reference indicate corresponding parts in all the views.

Figure 1 is a front elevation of the invention. Fig. 2 is a rear elevation thereof. Fig. 3 is a sectional view on the line 3 3 of Fig. 4. Fig. 4 is a sectional view on the line 4 4 of Fig. 3, and Figs. 5 and 6 are detail views of the dials.

$a$ indicates a frame, which may be of any preferred construction and which is arranged to be mounted on the derrick-floor alongside of the sand-line, which is indicated at $b$ in Figs. 1 and 2. The sand-line has a bailer $b'$ attached, and this passes down through the drive-pipe into the well in the usual manner.

Mounted in a lateral extension $a'$ of the frame $a$ is a shaft $c$, on which is carried fast a grooved wheel $c'$. This wheel is adapted to have its grooved periphery engaged by the sand-line $b$, so that as said line descends a rotary movement in the direction of the arrow (shown in Fig. 1) will be imparted to the drive-wheel $c'$.

At the lower part of the frame $a$ is located an idler or guide pulley $d$, which engages the sand-line, as shown, and at the upper part of the frame is arranged a similar pulley $d'$. This pulley has its axle $d^2$ carried by a clamp-frame $d^3$, the axle sliding transversely in a slot $a^2$ in the frame $a$. Mounted on the clamp-frame $d^3$ is a cam-lever $d^4$, by the manipulation of which the guide-pulley $d'$ may be moved toward or from the sand-line. When the lever $d^4$ is thrown downward or beyond the position shown in Fig. 1, the guide-pulley $d'$ is drawn against the sand-line, causing a slight bend therein, and thus forcing said line firmly to engage the drive-wheel $c'$. This insures that the movement of the sand-line will be accurately transmitted to the drive-wheel and avoids the slipping of the line.

The shaft $c$ extends rearwardly into a casing $e$, fastened to the rear of the frame $a$, as shown best in Fig. 2. This casing contains the dials and the gears thereof, as will now be described. The rear portion of the shaft $c$ (see Fig. 3) carries a flange $c^2$, which bears against the front wall of the casing $e$ and indirectly against the lateral projection $a'$ of the frame $a$, thus holding the shaft $c$ firmly in the proper position. Fastened to the shaft $c$ rearward of the flange $c^2$ is a pinion $f$, which meshes with a spur $f'$, suitably mounted in the casing and carrying to move therewith a pinion $f^2$. This pinion meshes with a spur-gear $f^3$, with which is connected to turn in unison a pinion $f^4$. This pinion meshes with a pinion $f^5$, which, together with a pinion $f^6$, is mounted to turn around a stub-shaft $f^7$, mounted in the casing $e$. The pinion $f^6$ meshes with a pinion $f^8$. The spur-pinions $f^3$ and $f^8$ are carried, respectively, on shafts $f^9$ and $f^{10}$, mounted in the casing $e$. The movement of the primary shaft $c$ will drive the spur-gear $f^3$ through the medium of the gear elements $f$, $f'$, and $f^2$, and the movement of the spur-gear $f^3$ will drive the spur $f^8$ through the medium of the gear elements $f^4$, $f^5$, and $f^6$. Arranged to turn with the spur-wheel $f^3$ is a dial $g$, which is mounted on the shaft $f^9$ by means of a hub $g'$ and a screw-collar $g^2$, such shaft $f^9$ turning freely in its bearings with the parts $g$, $f^3$, and $f^4$. Arranged to turn in time with the spur-wheel $f^8$ and the shaft $f^{10}$ is a dial $g^3$, which is mounted on the shaft $f^{10}$ and spaced from the gear $f^8$ by an annular enlargement $f^{11}$ on said gear. This arrangement of the parts $g^3$ and $g^8$ enables the gear $f^3$ and dial $g$ to project between said parts. The dial $g^3$ is held in proper place by a screw-collar $g^4$, bearing against the hub $g^5$ of the dial similarly to the parts $g^2$ and $g'$. It will be seen that the dial $g$, which moves in time with the gear $f^3$, will turn much faster than the dial $g^3$ and the gear $f^8$. The exact ratio of these movements may of course be changed to suit the conditions which the measuring instrument is required to meet. According to the arrangement which I have here illustrated as an example the dial $g$ will make twenty revolutions to one revolution of the dial $g^3$. Following this arrangement the dial $g$ indicates from one to one hundred and the dial $g^3$ indicates thousands, twenty numbers being marked on this dial, as illustrated in Fig. 6, thus making it capable of registering two thousand units. Reference to Fig. 2 will show that the dial $g$ has a part of its periphery visible at the back of the casing $e$ through a slot $e'$ in the casing and that the dial $g^3$ is likewise visible through a slot $e^2$ in the casing. Above the slot $e^2$ I prefer to mark two ciphers, as shown, these ciphers being read with the numbers produced on the dial $g^3$, so as to show the indications of said dial in hundreds. For example, in Fig. 3 the instrument is placed to indicate eighteen hundred.

In applying the invention the parts are arranged as shown in the drawings, and the drive-wheel $c'$, together with the other gear elements and the dials, is so arranged that the actual positions into which the sand-line falls will be accurately shown by the dials $g$ and $g^3$. Therefore as the sand-line drops the wheel $c'$ and shaft $c$ are set in motion, and this drives the various gear elements, causing the dials to advance continually, and if the parts are properly adjusted, as explained above, the dials will indicate accurately the depth to which the sand-line extends. I prefer to employ the sand-line for driving the measuring instrument, because this line in general practice is formed of wire threads and will not stretch. Further, the bailer which is attached thereto is of great weight and causes the line to drop quickly and prevents the line from bending or flexing at any point within the well, which flexing would obviously detract from the accuracy of the instrument.

It will be observed that the registering mechanism operates continuously notwithstanding the direction in which the sand-line moves. Therefore should the sand-line run downward and turn the register until it indicates eighteen hundred, as in Fig. 2, and then return twenty-five feet the register will be wound backward and will indicate seventeen hundred and seventy-five. This is essential to the intended use of the invention, for the reason that in dropping the bailer into wells of great depth the most experienced driller is unable to tell precisely when the bailer reaches the bottom, and it is therefore necessary before this can be determined to run the sand-line back and forth a number of times until by continually "feeling," so to speak, the driller determines when the bailer is actually in the bottom of the well and when the sand-line extends up taut from it. It will be seen that owing to the arrangement of the register to wind backward the sand-line may be moved back and forth any number of times, and when its final adjustment is attained the register will show exactly the depth to which the sand-line has been dropped. The register is therefore in this respect an inseparable part of the measuring apparatus. In all ordinary well-drilling apparatus the bailer is attached to one end of the sand-line, and the other end of the sand-line is attached to the sand-reel. The measuring apparatus must therefore be engaged with the sand-line at some point intermediate its ends, and this is made possible owing to the peculiar manner of mounting the guide-pulley $d'$. These pulleys are mounted on the frame $a$ and are grooved so that they will securely engage with the sand-line and will be prevented from running off of the sand-line as the latter moves up and down.

Having thus described my invention, I claim as new and desire to secure by Letters Patent—

A well-depth-measuring apparatus, comprising a vertically-extending frame, a register comprising a drive-wheel mounted on the frame intermediate its ends, the drive-wheel being adapted to be engaged by the well-rope, a rope-guide at one side of the drive-wheel and above the same, a rope-guide at the other side of the drive-wheel below the same, a clamp-frame movably mounted in the main frame transversely to the line of the rope and carrying one of said rope-guides, and a cam working with the clamp-frame to move the same horizontally, whereby to bind the rope against the drive-wheel of the register.

In testimony whereof I have signed my name to this specification in the presence of two subscribing witnesses.

CHARLES RIPLEY HUDSON.

Witnesses:
M. E. O'CONNOR,
L. D. THURSTON.